US012109956B2

(12) United States Patent
Mezaael

(10) Patent No.: US 12,109,956 B2
(45) Date of Patent: Oct. 8, 2024

(54) ADAPTIVE UPFITTER SWITCHES

(71) Applicant: FORD GLOBAL TECHNOLOGIES, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 17/183,831

(22) Filed: Feb. 24, 2021

(65) Prior Publication Data

US 2022/0266775 A1 Aug. 25, 2022

(51) Int. Cl.
*B60R 16/023* (2006.01)
*B60Q 9/00* (2006.01)
*G07C 5/08* (2006.01)

(52) U.S. Cl.
CPC ........ *B60R 16/0231* (2013.01); *G07C 5/0808* (2013.01); *G07C 5/0816* (2013.01); *B60Q 9/00* (2013.01)

(58) Field of Classification Search
CPC .............. B60R 16/0231; G07C 5/0808; G07C 5/0816; B60Q 9/00; B60K 2370/12; H03K 17/18; H03K 17/20; H03K 17/22; H03K 17/26
See application file for complete search history.

(56) References Cited

U.S. PATENT DOCUMENTS

| 2011/0220469 | A1* | 9/2011 | Freiburger | B60K 37/06 200/61.54 |
| 2013/0317732 | A1 | 11/2013 | Borg et al. | |
| 2014/0111315 | A1* | 4/2014 | Geerlings | G07C 9/00309 340/12.5 |
| 2017/0023127 | A1* | 1/2017 | Greasamar | B60K 23/08 |
| 2018/0101998 | A1 | 4/2018 | Pierce et al. | |
| 2019/0279440 | A1 | 9/2019 | Ricci | |

* cited by examiner

*Primary Examiner* — Omer S Khan
(74) *Attorney, Agent, or Firm* — Joseph Zane; Brooks Kushman P.C.

(57) ABSTRACT

A system includes one or more upfitter switches and a plurality of controllable vehicle features, wherein at least two of the features are controllable by a first of the upfitter switches, based on a dynamic configuration of the first upfitter switch. The system also includes a processor that can determine that a trigger state for reconfiguring the first upfitter switch has occurred and re-assign the first upfitter switch from controlling a first of the at least two features to controlling a second of the at least two features, responsive to the trigger state.

11 Claims, 4 Drawing Sheets

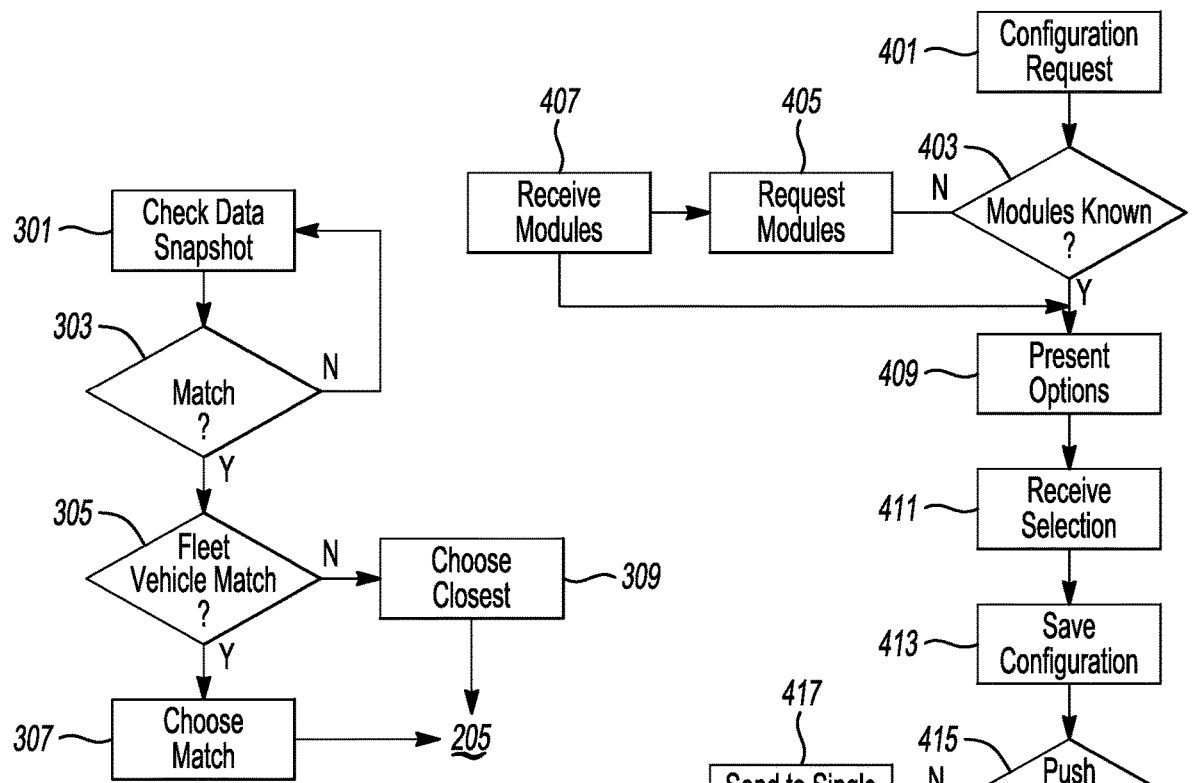
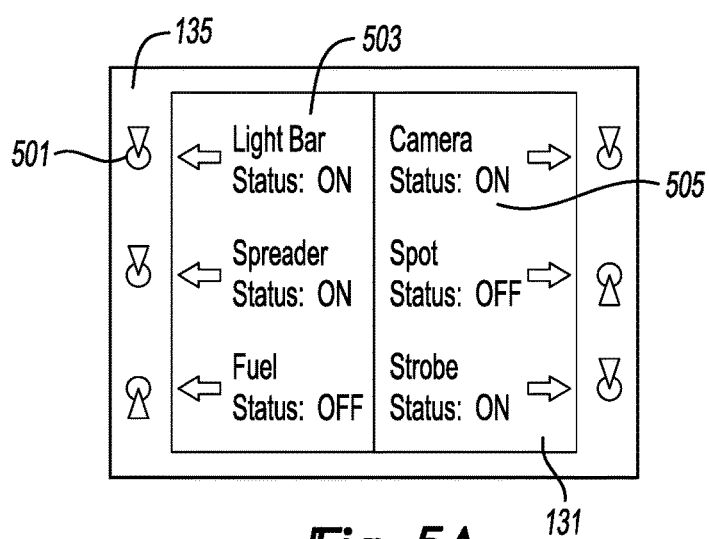
Fig-3
Fig-4
Fig-5A

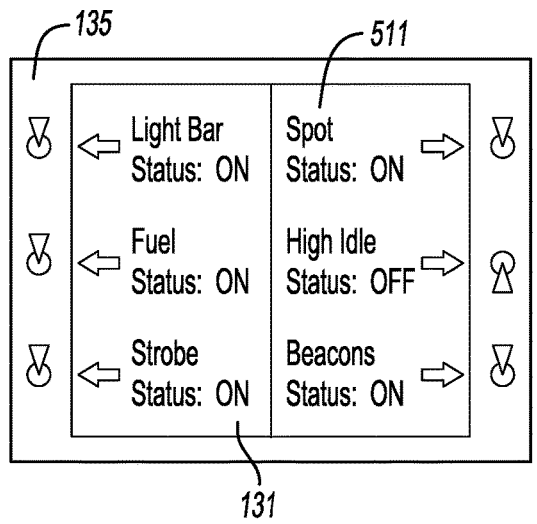
*Fig-5B*
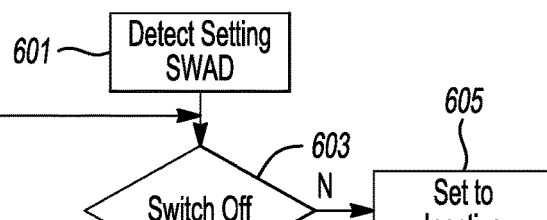
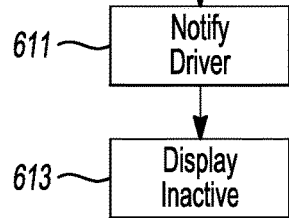
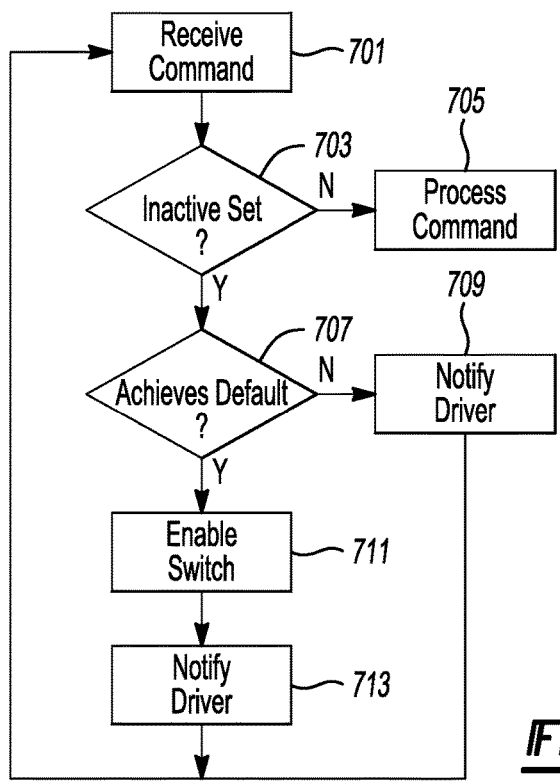
*Fig-6*
*Fig-7*

ADAPTIVE UPFITTER SWITCHES

TECHNICAL FIELD

The illustrative embodiments generally relate to adaptive upfitter switches.

BACKGROUND

Upfitter switches provide power to vehicle add-ons and/or access to control and function applications for those modules. While often an aftermarket installation, if an original equipment manufacturer (OEM) installs an upfitter switch, there are added assurances for compatibility, and the customer does not have to make a separate visit to a dealer or mechanic to have such switches installed. Upfitter switches can control a variety of systems, such as, but not limited to, plows, LED lights, bull bar lights, off-road lights, spotlights, strobe lights, emergency lights, salt spreaders, road sweepers, garage controls, high idling, beacons, power control systems, auxiliary pumps, cameras, driveline controllers, BLUETOOTH modules, air intake systems, etc.).

Typically, there is a one-to-one configuration for such switches. That is, when a customer obtains a module or system controllable by a switch, the customer also installs a switch for that module or system. This results in direct control over the connected system and allows the user to understand the one-to-one relationship of the switch and what will be controlled each time the switch is activated.

At the same time, many fleets have multi-purpose vehicles that perform a variety of functions depending on the weather and assigned tasks. For example, a truck that serves as a salt spreader and snow plow in the winter may serve as a street sweeper and hauler in the fall. Patrol vehicles for enforcement may have a variety of functions assigned thereto as well. With the current configuration of upfitter switches, each module or system may include its own switch, which makes it easy for a user to remember which switch controls what, but which may also result in inclusion of a significant number of switches based on multiple intended uses of a vehicle.

SUMMARY

In a first illustrative embodiment, a system includes one or more upfitter switches and a plurality of controllable vehicle features, wherein at least two of the features are controllable by a first of the upfitter switches, based on a dynamic configuration of the first upfitter switch. The system also includes at least one processor enabled to determine that a trigger state for reconfiguring the first upfitter switch has occurred and re-assign the first upfitter switch from controlling a first of the at least two features to controlling a second of the at least two features, responsive to the trigger state.

In a second illustrative embodiment, a method includes accessing a list of one or more vehicle-detectable triggers associate with one or more upfitter switches, wherein at least one trigger serves as the basis for switching assignment of control, for a first upfitter switch, from a first vehicle system to a second vehicle system and determining that a state change indicated by the trigger has occurred. Responsive to the state change, the method includes reassigning control of the first upfitter switch from the first system to the second system and reverting the first system to a first system base state responsive to reassignment.

In a third illustrative embodiment, a method includes reassigning control of an upfitter switch from a first system to a second system, responsive to occurrence of a vehicle-detectable trigger event. The method also includes determining that a current upfitter switch setting between at least two states is set to a control state different from an actual state of the second system, following the reassigning and preventing control of the second system via the upfitter switch until the actual state of the second system matches the control state.

BRIEF DESCRIPTION OF THE DRAWINGS

FIG. 3 shows an illustrative example of a data-snapshot trigger usage for reconfiguration;

FIG. 4 shows an illustrative example of a configuration process;

FIGS. 5A and 5B show illustrative examples of upfitter switch displays;

FIG. 6 shows an illustrative example of a switch control reset process; and

FIG. 7 shows an illustrative example of command processing for a upfitter switch.

DETAILED DESCRIPTION

Figure 1:
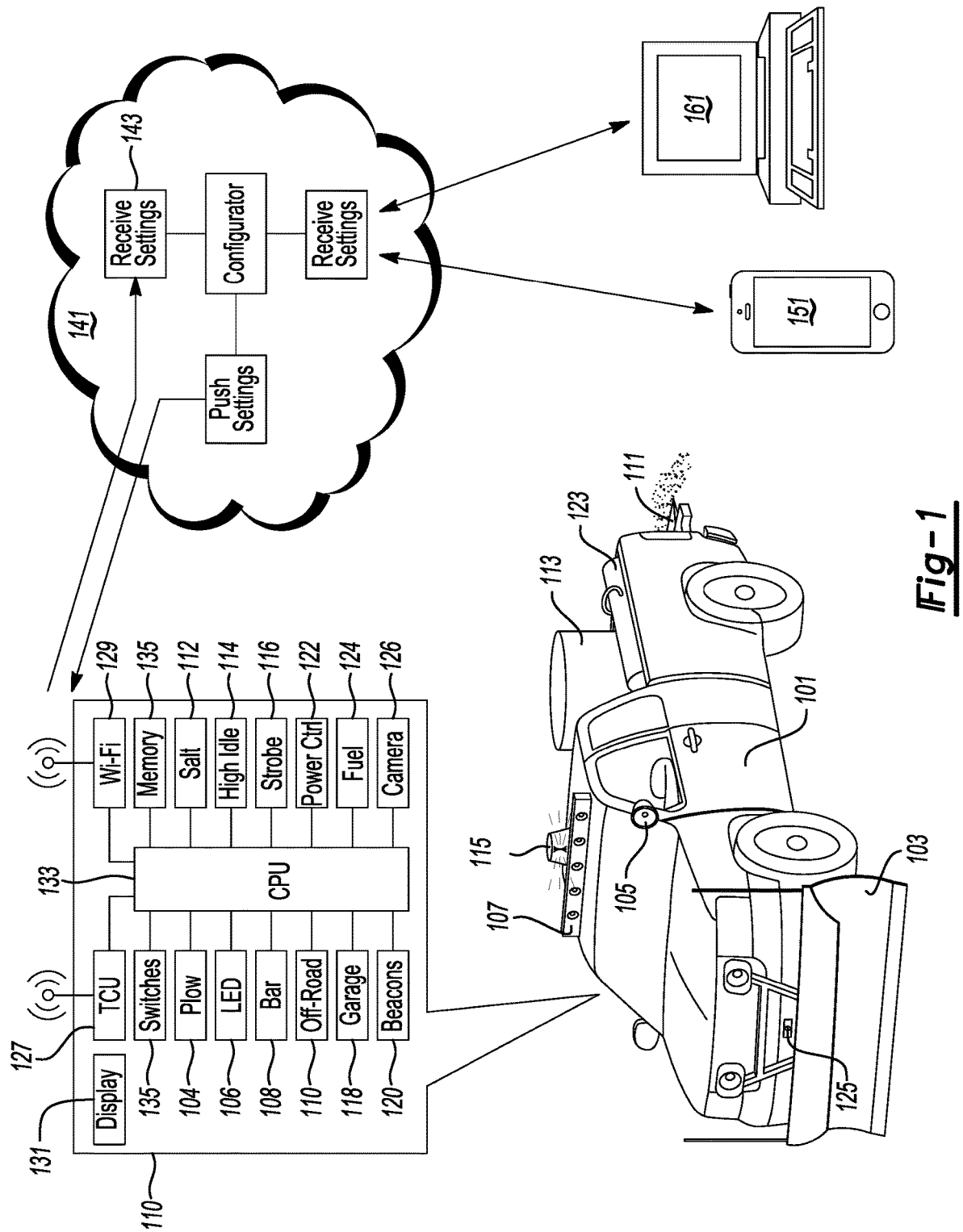
FIG. 1 shows an illustrative example of a vehicle with multiple controllable modules and features installed.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be faciltated through use of one or more processors working alone or in conjunction with each other and executing instructions stored on various non-transitory storage media, such as, but not limited to, flash memory, programmable memory, hard disk drives, etc. Communicaiton between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Upfitter switches are commonly an aftermarket product, installed in conjunction with accessories. They commonly have a one-to-one relationship with the given accessory, and so operators know which switch controls which accessory. Fleet managers may want to have vehicles perform multiple functions, and so when the vehicles are using different add-ons and systems the operator will need a variety of additional switches installed. Private vehicle owners may also want to install various aftermarket controls, and so would typically need a switch for each control.

The illustrative embodiments propose dynamic, repurposable upfitter switches. These switches can be assigned multiple functions based on software selections, and can be repurposed by configuration by a fleet manager, owner, driver, etc. The switches can adapt based on an assigned task assigned to a vehicle, a geofence or other geographic trigger, or any other reasonable trigger for adapting control functionality.

FIG. 1 shows an illustrative example of a vehicle with multiple controllable modules and features installed. In this example, a vehicle 101 includes twelve functional systems controlled by six switches. In installations where control can be obtained over a vehicle bus, without direct connection to a functioning system, such as control routed by a processor 133, there are a massive number of configurations that can be obtained. That is, instead of switch 1 controlling features 1 and 2, switch one could control any number of features in a given configuration, which allows for the vehicle 101 to be very customized for a task using existing or available installed systems.

In this example, the vehicle 101 includes a plow 103 and a plow control application 104. The application can allow for a greater deal of control (as opposed to up or down) and may also allow for easier repurposing of switches. If a given feature requires a direct connection to the switch, and does not have an application allowing for repurposing, then the function/system can have a physical switch associated therewith in between the upfitter switch and the system, which can shunt control away from the system when the system is not to be controlled by the switch.

The vehicle 101 also includes systems such as spotlight 105, light bar 107, salt spreader 111 and salt tank 113, strobe or flashing light 115, fuel pump 123 and camera 125. These systems have corresponding illustrative applications installed in vehicle system 110, such as LED controls (for other LEDs) 106, light bar controls 108, off-road controls 109, salt spreader controls 112, high idle controls 114, strobe light controls 116, garage door controls 118, beacon controls 120, power systems controls 122, fuel pump controls 124 and camera controls 126.

Many of the illustrative control applications correspond to systems not shown, such as off-road lights and/or LEDs, high-idle, power system controls, etc. With this many custom systems installed on a vehicle 101, customers may prefer to have an OEM install the systems and switches, to avoid aftermarket modification of so many systems. The control applications can be stored in one or more vehicle 101 memories 135. Customization and control configurations can also be stored in memory 135.

In this example, the vehicle 101 also includes at least one of Wi-Fi 129 or a telematics control unit 129 connection, for connection to the cloud 141. While not necessary, such remote connectivity can allow for reconfiguration of switches by a remote entity 151, 161. For example, if a driver cannot reconfigure switches, but a system is not working, the fleet manager 161 can repurpose a switch on-demand allowing for immediate re-use of the switch for another purpose, which can either assist the vehicle 101 in a current task or allow the vehicle 101 to perform a different task.

The cloud 141 can store a variety of configurations 143 that can be configured through a connection 145 to the remote systems such as a cell phone 151, or computer 161. Changes to configurations received in this manner can be pushed to the vehicle by process 149. Drivers may also be able to reconfigure settings which are received by a configuration reception process 147 to be stored in the cloud as future configurations if desired. Thus, in systems where the driver can reconfigure switches onboard, the driver can actively repurpose and save new settings.

Reconfiguration can be implemented based on a variety of triggers and state settings. Drivers may be given an assigned task, which may be indicated to the vehicle 101, for example, and the task (plow, salt truck, refueling truck, etc.) may cause activation of a certain configuration designated for the task. In other examples, vehicles 101 may travel from task to task, and geographic coordinates or surrounding environs may cause a change to the configuration.

Environmental considerations may be obtained by use of vehicle data snapshots, which are data snapshots captured by vehicle 101 sensors and systems. Data snapshots can have a configuration associated therewith (e.g., indicating weather, terrain, etc) and other vehicles 101 that detect similar data in a given instance may use such a snapshot as the basis for implementing a given upfitter switch configuration. Other triggers, such as light level, weather, destination, etc. can be used as the basis to dynamically repurpose upfitter switches as well.

Figure 2:
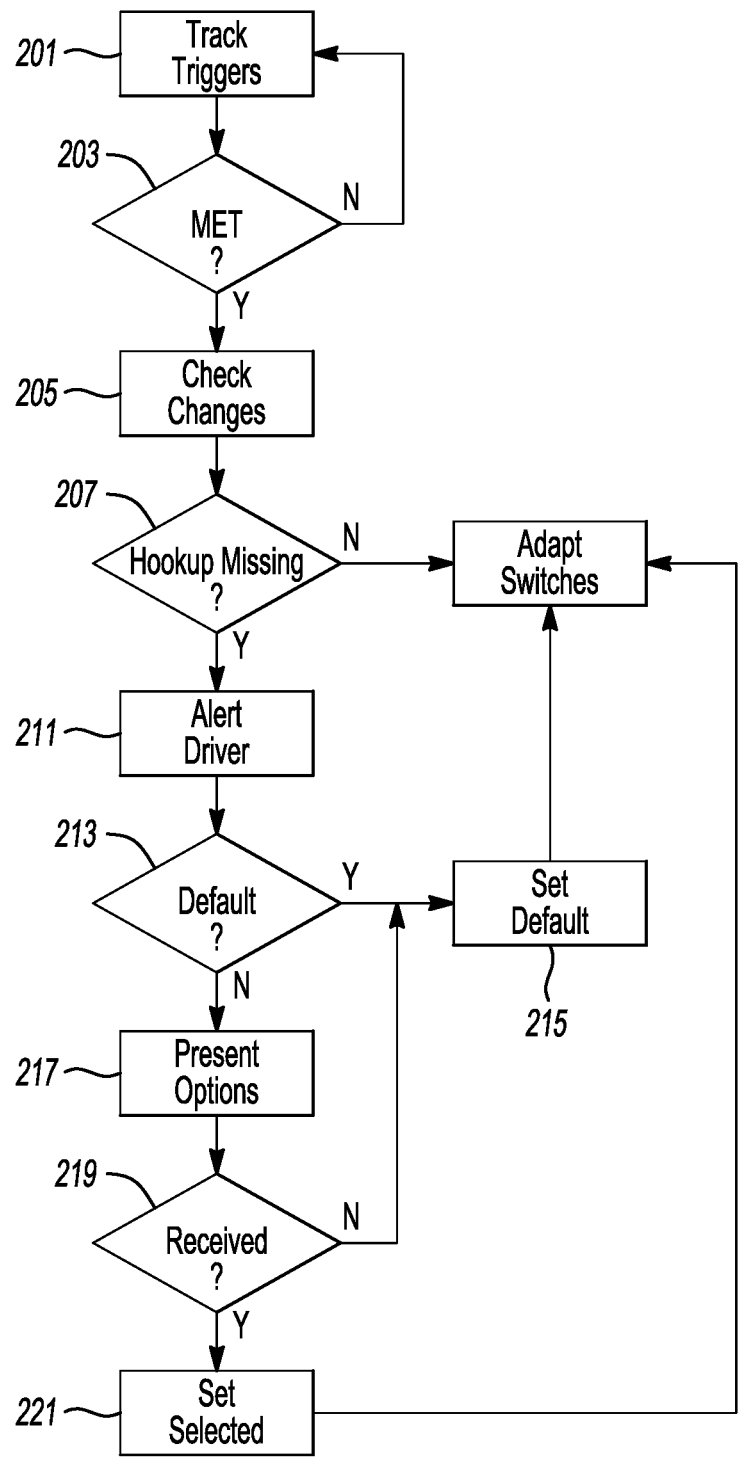
FIG. 2 shows an illustrative process for dynamic switch reconfiguration.

FIG. 2 shows an illustrative process for dynamic switch reconfiguration. In this example, the process 201 executing on the vehicle 101 or in the cloud 141, if the vehicle 101 has an active connection, tracks any triggers associated with upfitter reconfiguration at 201 for that vehicle 101. For example, a personal vehicle may have three settings, one for driving to work, one for driving home, and one for weekend travel. So in that instance the vehicle 101 could track the destinations of the vehicle 101 and/or day of week. Or, the process could track the location of the vehicle 101 against geofences around a home and/or work, at least on weekdays.

A work vehicle may have a multitude of configurations and triggers associated therewith. A fleet manager may assign an initial task in the morning, before the vehicle 101 leaves a yard, and then as the vehicle 101 travels from task to task the vehicle 101 can track various triggers (locations, driver commands, destinations, weather, data snapshots, etc.) to determine which next switch configuration to engage.

If one or more triggers are met at 203, the vehicle 101 can repurpose one or more switches. Some switches, for example, may be single switches that change function based on a trigger (e.g., a door-open switch switches from a work gate control to a home garage control based on destination), while other triggers may cause a complete reconfiguration or reconfiguration of multiple switches.

In this example, which will refer to a fleet vehicle for illustrative purposes, the process determines which systems of the vehicle 101 will be assigned to switch control at 205. Since the vehicle 101 may have certain systems attached and detached (e.g., a plow or shovel), switching control to a missing system may not be what a driver or fleet manager wants to happen. Accordingly, the process may check to determine if the system is present and active (e.g., is the salt spreader bucket loaded) at 207.

If all the systems are present and functional at 207, the process may set the new configuration at 209 and allow the driver to control the new systems as assigned to switches. This may also result in a display of new switch assignments on a display associated with a switch. For example, a switch may have multiple LEDs associated therewith, two to indicate state and two or more to indicate an active system. This would work better with systems where each switch controls discrete systems. If the switches have a display associated therewith, then the display can display switch characteristics and new assignments, making it easier to assign any switch to any reasonable system and simply showing the driver which switches activate which systems.

If a given system is missing or inactive, the process may alert the driver at 211 that a given assignment was intended, but is not possible. If there is no associated display, there may be a notice pushed to a driver device or an audio announcement from a vehicle computer. The system may also alert an owner/manager of the missing or inoperative system as well.

If there is a default switch setting at 213, which could be the prior controlled system or another default setting, the process may set the default switch setting at 215. Alternatively, the system may present one or more optional alternatives to a fleet manager or driver at 217. This can include, for example, only displaying available systems and systems which are not presently controlled by another switch, to avoid having two switches control the same system and resulting in driver confusion. If a new assignment is received at 219, from the driver or manager, the process may set the received assignment at 221. If no new assignment is received, the process may use any available default switch or prior assignment. Switch reconfiguration may also be triggered by state-exhaustion, such as an empty refueling tank or salt barrel. The reconfiguration can come with an alert, and may let the driver know that tasks should be change or recharge of the system should be obtained.

FIG. 3 shows an illustrative example of a data-snapshot trigger usage for reconfiguration. In this example, the vehicle 101 uses a data snapshot as the basis for reconfiguration. This can be useful for vehicles that have adaptable tasks, and which may adapt as they encounter situations. This prevents the fleet manager from having to assign specific situational configurations by allowing the fleet manager to leverage data snapshots and "smart" reconfiguration if desired. Situationally, this may be a useful way to achieve intermittent reconfiguration of systems while a vehicle 101 travels from tasks for which a more fixed reconfiguration will be eventually applied.

In this example, the process periodically checks vehicle data snapshots at 301 obtained by the object vehicle 101. These can be obtained by vehicle sensors and feedback systems, and may also include driver input about undetectable conditions. If there is a match or partial match between a current data snapshot and existing snapshots that have configurations associated therewith at 303, the process may also determine if there is a match in terms of systems between a current vehicle 101 and the vehicle taking the snapshot that was matched. This is to help determine if reconfiguration to the prior (other vehicle) settings is appropriate.

If there is a match to a vehicle that took the snapshot, in terms of systems, for example, then the process may choose the matching vehicle system configuration corresponding to the prior data snapshot at 307. If there is not a match, or is a partial match at 305, the process may choose the closest match at 309. For example, a vehicle may lack a plow, but may include a salt spreader that is loaded for intermittent use. Encountering snowy and icy conditions may engage both the plow and salt spreader, but if the vehicle 101 is missing the plow, a switch may still be assigned to the salt spreader so the vehicle 101 can begin spreading salt. If the conditions mitigate and salt is not needed, a new data snapshot corresponding to clean roads may cause the spreader switch to reconfigure to another feature.

FIG. 4 shows an illustrative example of a configuration process. In this example, the process allows a user/owner/manager/driver to reconfigure switches to set up a dynamic state swap. The process receives a request to configure the switches in a given vehicle (or for a type of vehicle, if a specific vehicle is not chosen). If the process does not have a record of the available modules/features/systems that can be assigned at 403, the process may request that information from the vehicle 101 or a database at 405. For example, a given vehicle 101 may respond at 407 with specifically installed systems, or a fleet database may have record of various types of fleet vehicles that are similarly configured (within a type) and can respond with the known systems provided to a selected type of vehicle at 407.

Once the modules or assignable systems are known, the process may present (e.g., via a display, in a vehicle, on a mobile device, on a computer) the assignable options at 409. This may also include any triggers that are trackable by a vehicle, which can be associated with a switch change or a full set of reconfigurations. For example, a foggy setting may always switch a camera control (which may be useless in fog) to a light-bar control, but other additional conditions or tasks can also cause a full reconfiguration of more than just the lights. So the manager could set the camera/lights toggle and associate it with fog, and then also set one or more more complete reconfigurations associated with different conditions.

The vehicle or cloud, or both, will save the configuration at 413. In this example, the reconfiguration process executes remotely at device 151 or computer 161. Accordingly, the configuration is saved in the cloud 141 at the configuration process 143. The process also offers the option to push the configuration to a fleet at 415. If the configuration is not distributed to a fleet, then it can be distributed to a vehicle at 417.

Otherwise, the process may identify one or more vehicles to which the configuration should apply at 413(e.g., without limitation, all trucks with both cameras and light bars, all trucks of a certain type, a specifically identified group of vehicles, vehicles classified for use for certain tasks, etc.). The process can then push the updated configuration to the appropriate vehicles 101 at 421.

If certain selected or identified vehicles 101 lack the corresponding systems and controls, the process may result in some errors when a configuration is pushed. These errors may indicate a missing system, an inoperable system, etc. and may be received at 423. The manager or owner can be given alternative options to configure at 425, so that certain vehicles 101 do not have errors when they try to apply a new configuration that was pushed to that vehicle 101.

FIGS. 5A and 5B show illustrative examples of upfitter switch displays. This is a display that could be displayed in a vehicle or on a portable device or screen, for example. Here, the example is a six switch display 131 corresponding to systems in vehicle 101. Switches 501 show assigned functions/systems and the state of the given system 503. When a new configuration is applied, the display 131 changes and a new system is assigned to a given switch 511.

FIG. 6 shows an illustrative example of a switch control reset process. In this example, the process resets a switch to control a new function/system, but does so in a manner that prevents immediate activation of the new function/system if the switch is in an "on" or "active" state. This avoids inadvertent usage or deployment of the new system upon reassignment, such as switching an active strobe-light control to a plow-control and having the plow immediately deploy. In a similar manner, when an active function is swapped out of an active switch (e.g., lights on in the above example), the system may automatically power down the active system (because it may lack a control switch in the new configuration), provide the driver with an alert allowing for powering down of the system (e.g., a selectable option to power down), execute the switch only after the driver has deactivated the system that will not have a control, or note a new control for the system assigned in a new configuration (e.g., the strobe moves to a new control) and control the system according to the control state of the new switch.

In any reasonable version of the preceding examples for switches that change function while active, the new function could be highlighted or noted in some manner, or if the switch will not change function until deactivated, a similar highlighting or visual or audible queue can prompt the driver to take the appropriate action.

In this example, the process detects a setting swap occurring at 601, where a trigger, for example, causes imposition of a new configuration for switch controls. When a switch is not turned off at 603, the system now assigned to the switch is set to an inactive state at 605, which is to say that until a remediation step (as discussed in FIG. 7) has been taken, the switch does not directly control the state of the newly assigned system. This prevents inadvertent immediate activation of the newly assigned system.

If more than one switch has changed functions at 607, the process moves to a next switch at 609 and repeats the disablement step if needed, until all switches have been accommodated. So, for example, if six active switches have their control switched, all six new functions/systems may be disabled until remediation. If one or more of the prior controlled systems is assigned to a new switch, that system may be left in an on state (since that was the previous state) and will not be directly controllable until remediation has been taken, if desired. On the other hand, that system may be directly controllable if the new switch is in the same state as the switch from which control was reassigned (i.e., if the old switch 1 controlled the strobe and was ON, and the strobe is assigned to switch 4, which is also ON, then remediation may be deemed unnecessary and direct control via switch 4 may be provided since the switch states correspond to an expected system state).

Once the disablement measures are complete, the process may notify a driver that the swap has occurred, as well as provide notice that one or more systems are disabled, if that is the case, at 611. The display, if any, may also display the disabled systems at 613, along with instructions to enable control if desired. Audio notifications or a display pushed to a mobile device may supplement or replace the in-vehicle display for switch assignment and driver messaging.

FIG. 7 shows an illustrative example of command processing for a upfitter switch. This process allows for enabling disabled systems disabled according to a process similar to that in FIG. 6. When a command is received via switch activation at 701, the process may determine if the controlled system is set to an inactive state at 703. That is, the command cannot be processed because the switch was not yet in a baseline position, or the switch state did not presently correspond to a current system state. When the switch already has direct control and/or the switch state and system state correspond, the process can simply process the commanded control over the system at 705 (e.g., turn it on, turn it off, etc.).

When the system is deactivated until a baseline switch state is achieved, or when the system state and switch state do not correspond, the process determines if the new switch state (that resulted in the command at 701) corresponds to a baseline state ay 709 (or now matches the system state). If this is still not the case (e.g., the switch has more than a binary state set and the baseline or match is not achieved by a one-state transition of the switch), the process may notify the driver at 709 so the driver both understands why no command was processed and understands to set the switch to a baseline state. Instructions about which state is baseline or how to set the switch to a baseline state may be included with the notification.

If the baseline state or matching state is achieved by the command at 709, the process may enable the switch for direct control at 711 and notify the driver (visually, audibly, etc.) that the switch is now active for control of the assigned system.

The illustrative embodiments provide a system whereby fewer upfitter switches than controlled systems are needed and wherein the system can both reassign control of switches to systems and do so dynamically, on-the-fly and in response to changing conditions or assigned tasks.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
    one or more upfitter switches;
    a plurality of controllable vehicle upfits, wherein at least two of the upfits are controllable by a first of the upfitter switches, based on a dynamic configuration of the first upfitter switch;
    at least one processor enabled to:
    determine that a trigger state, including at least one geo-fence, has occurred, wherein the trigger state is activated by crossing into or out of the geo-fence, the trigger state for reconfiguring the first upfitter switch;
    re-assign the first upfitter switch from controlling a first of the at least two features to controlling a second of the at least two features, responsive to the trigger state; and
    confirm that the second feature is in a baseline state prior to allowing control of the second feature using the first upfitter switch, after reassignment of the first upfitter switch to control of the second feature following the trigger.

2. The system of claim 1, wherein the controllable upfits include at least one of a plow, a salt spreading system element, or a high-idle control.

3. The system of claim 1, wherein the controllable upfits include at least one vehicle light.

4. The system of claim 1, wherein the trigger includes a time-of-day.

5. The system of claim 1, wherein the trigger includes a weather condition detectable by the vehicle.

6. The system of claim 1, wherein at least one of the at least one processors is enabled to set the first of the at least two features to a baseline state, responsive to re-assignment of the first upfitter switch to control the second feature.

7. The system of claim 1, wherein at least one of the at least one processors is enabled to set the second feature to the baseline state responsive to determining that the second feature is not in the baseline state.

8. A method comprising:
    accessing a list of one or more vehicle-detectable triggers associate with one or more upfitter switches, wherein at least one trigger serves as the basis for switching assignment of control, for a first upfitter switch, from a first vehicle system to a second vehicle system;
    determining that a state change indicated by the trigger has occurred;
    responsive to the state change, reassigning control of the first upfitter switch from the first system to the second system;
    reverting the first system to a first system baseline state responsive to reassignment;
    determining that the second system is not in a second system base state, following reassignment of control of the first upfitter switch to the second system;
    blocking control of the second system via the first upfitter switch until the second system is in the second system base state; and
    issuing an alert responsive to the determining.

9. The method of claim 8, further comprising:
    determining that the second system is not in a state corresponding to a current first upfitter switch setting, following reassignment of control of the first upfitter switch to the second system;
    blocking control of the second system via the first upfitter switch until the first upfitter switch setting corresponds to a current state of the second system; and
    issuing an alert responsive to the determining.

10. The method of claim 9, wherein the determining includes determining that the second system is in an off state while the current first upfitter switch setting is set to an on state.

11. The method of claim 8, wherein the reversion of the first system to the baseline state includes powering down the first system.

* * * * *